(12) United States Patent
Sar et al.

(10) Patent No.: US 8,016,249 B2
(45) Date of Patent: Sep. 13, 2011

(54) SHAPE-CHANGING STRUCTURE MEMBER WITH EMBEDDED SPRING

(75) Inventors: David R. Sar, Corona, CA (US); Terry M. Sanderson, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 719 days.

(21) Appl. No.: 12/120,273

(22) Filed: May 14, 2008

(65) Prior Publication Data

US 2009/0283643 A1 Nov. 19, 2009

(51) Int. Cl.
*B64C 3/54* (2006.01)
(52) U.S. Cl. .............. 244/218; 244/219; 244/123.1; 244/123.8; 244/123.9
(58) Field of Classification Search ............. 244/218, 244/219, 45 R, 99.8, 123.1, 123.8, 123.9
See application file for complete search history.

(56) References Cited

U.S. PATENT DOCUMENTS

| | | | |
|---|---|---|---|
| 2,559,827 A | 7/1951 | Northrop | |
| 3,628,352 A * | 12/1971 | Stuemky | 464/58 |
| 5,049,591 A * | 9/1991 | Hayashi et al. | 521/159 |
| 5,082,207 A | 1/1992 | Tulinius | |
| 5,181,678 A | 1/1993 | Widnall et al. | |
| 5,662,294 A | 9/1997 | Maclean et al. | |
| 6,010,098 A | 1/2000 | Campanile et al. | |
| 6,264,136 B1 | 7/2001 | Weston | |
| 6,705,568 B2 | 3/2004 | Lee | |
| 6,834,835 B1 * | 12/2004 | Knowles et al. | 244/198 |
| 7,777,165 B2 * | 8/2010 | Sanderson et al. | 244/3.27 |
| 2002/0195177 A1 | 12/2002 | Hinkley et al. | |
| 2003/0036090 A1 | 2/2003 | Patil et al. | |
| 2004/0086699 A1 * | 5/2004 | Schneider | 428/292.1 |
| 2005/0157893 A1 | 7/2005 | Pelrine et al. | |
| 2005/0206096 A1 | 9/2005 | Browne et al. | |
| 2007/0107189 A1 | 5/2007 | Prichard et al. | |
| 2008/0061192 A1 | 3/2008 | Sullivan | |
| 2009/0072094 A1 | 3/2009 | Sanderson et al. | |

(Continued)

FOREIGN PATENT DOCUMENTS

CN 101028866 9/2007

(Continued)

OTHER PUBLICATIONS

International Search Report and Written Opinion from corresponding International Application No. PCT/US09/40762.

(Continued)

*Primary Examiner* — Tien Dinh
*Assistant Examiner* — Justin Benedik
(74) *Attorney, Agent, or Firm* — Renner, Otto, Boisselle & Sklar, LLP

(57) ABSTRACT

A shape-changing structural member has a shape-changing material, such as a suitable foam material, for example a polymer foam capable of withstanding at least 300% strain or a metal alloy foam capable of withstanding at least 5% strain. Springs, such as one or more coil springs, provide structural support for the shape-changing material. The springs may also be used to provide forces to expand and contract the shape change material. The springs may include pairs of concentric springs, one inside of another. The concentric springs may surround an underlying skeleton structure that supports the shape-changing material and/or aids in changing the shape of the material. The concentric springs may or may not be wrapped around the underlying skeleton structure. Multiple springs or pairs of springs may be coupled together using a sheet metal connector.

19 Claims, 3 Drawing Sheets

U.S. PATENT DOCUMENTS

| | | | |
|---|---|---|---|
| 2009/0206192 A1* | 8/2009 | Sanderson et al. | 244/3.27 |
| 2009/0283936 A1 | 11/2009 | Sanderson et al. | |
| 2009/0286101 A1* | 11/2009 | Sar et al. | 428/613 |
| 2010/0030308 A1* | 2/2010 | Anderson et al. | 607/115 |
| 2010/0282917 A1* | 11/2010 | O'Shea | 244/218 |

FOREIGN PATENT DOCUMENTS

| | | |
|---|---|---|
| EP | 0361418 A2 | 4/1990 |
| EP | 0905019 A2 | 3/1999 |
| EP | 1607602 | 12/2005 |
| GB | 2445099 | 6/2008 |
| JP | 60145385 A | 7/1985 |
| JP | 2009047179 A | 3/2009 |
| WO | 9308013 A1 | 4/1993 |
| WO | 9324300 A1 | 12/1993 |
| WO | 03068584 | 8/2003 |
| WO | 2007001392 | 1/2007 |
| WO | 2008068472 A1 | 6/2008 |

OTHER PUBLICATIONS

Shaw, John A. et al., "The Manufacture of Niti Foams", Proceedings of 2002 ASME International Mechanical Engineering Congress and Exposition, (2002), pp. 1-10.

Perkins, David A. et al., "Morphing Wing Structures for Loitering Air Vehicles", 45th AIAA/ASME/ASCE/AHS/ASC Structures, Structural Dynamics & Materials Conference, (2004), pp. 1.

Claims from related U.S. Appl. No. 12/120,271, filed May 14, 2008.

Claims from related U.S. Appl. No. 12/120,275, filed May 14, 2008.

Thill C. et al., "Morphing Skins", Aeronautical Journal, (2008), vol. 112, No. 1129, [retrieved from internet], <www.aer.bris.ac.uk/research/fibres/morph%20pics/RoyAeroSocMorphSkin.pdf>.

Sanderson, Terry, "Shape Memory Polymer Characterization for Advanced Air Vehicle Technologies", Raytheon Technology Today, (2007), vol. 2007, No. 4, [retrieved from internet] <www.raytheon.com/technology_today/archive/2007_issue 4.pdf>.

* cited by examiner

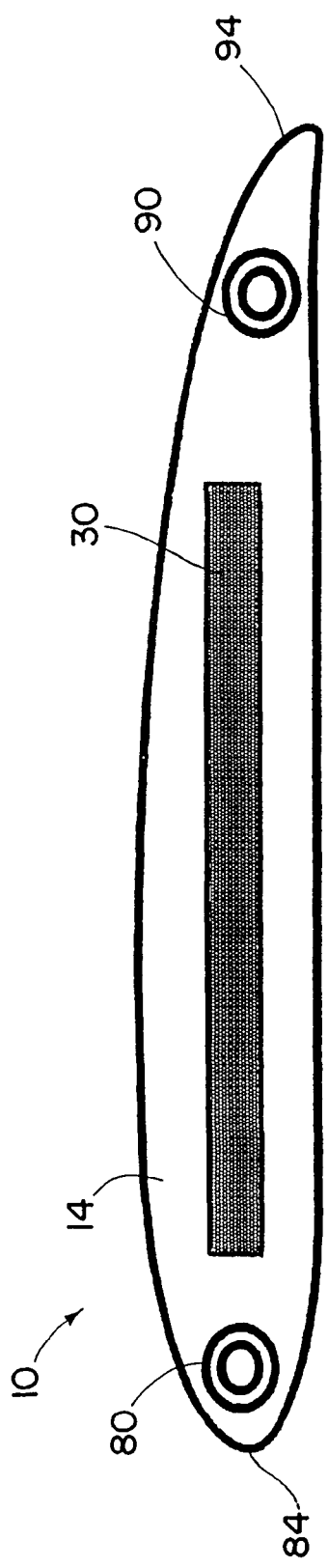
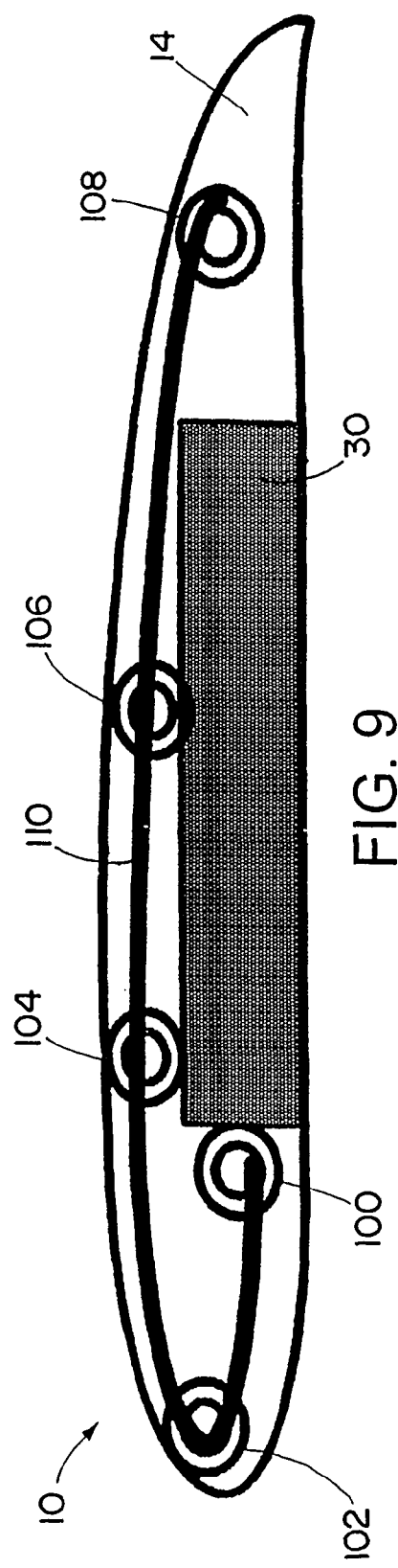

SHAPE-CHANGING STRUCTURE MEMBER WITH EMBEDDED SPRING

RELATED APPLICATIONS

This application is related to two commonly-assigned concurrently-filed applications, "Structure with Reconfigurable Polymer Material" Ser. No. 12/120,271, and "Shape-Changing Structure with Superelastic Foam Material" Ser. No. 12/120,275. Both of these applications are hereby incorporated herein by reference in their entireties.

BACKGROUND OF THE INVENTION

1. Technical Field of the Invention

The invention is in the field of reconfigurable structural members.

2. Description of the Related Art

Metal foam materials have been used in static structures, such as for bone replacement.

Shape memory polymer materials have been used for morphing or shape changing structures, components, and hardware. Unlike shape memory alloys, shape memory polymers do not exert enough force during shape change to overcome anything but the weakest of forces. Attempts have been made to develop structural supports to prevent the shape memory polymer material from warping out of desired shapes. However, this has been found to severely limit the shape changes that practically can be achieved.

It will be appreciated that there is room for improvement in the area of use of shape memory polymer materials.

SUMMARY OF THE INVENTION

According to an aspect of the invention, a shape-changing structure member includes a shape-changing material supported coil springs within the material.

According to another aspect of the invention, a shape-changing structural member includes: a shape-changing structural material capable of elastic deformation at strains of at least 5%; and one or more springs embedded in the shape-changing structural material, wherein the one or more springs provide structural support to the shape-changing material.

According to yet another aspect of the invention, an extendible aircraft wing includes: a shape-changing material configured to be extended and retracted; and a pair of concentric springs embedded in the shape-changing material. The springs have an axial length in a direction in which the shape-changing material is to be extended and retracted. The springs provide structural support to the shape-changing material.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale:

FIG. 8 is a cross-sectional view showing a second spring configuration for use in the wing of FIG. 1; and FIG. 9 is a cross-sectional view showing a second spring configuration for use in the wing of FIG. 1.

DETAILED DESCRIPTION

A shape-changing structural member has a shape-changing material, such as a suitable foam material, for example a polymer foam capable of withstanding at least 300% strain or a metal alloy foam capable of withstanding at least 5% strain. Springs, such as one or more coil springs, provide structural support for the shape-changing material. The springs may also be used to provide forces to expand and contract the shape change material. The springs may include pairs of concentric springs, one inside of another. The concentric springs may surround an underlying skeleton structure that supports the shape-changing material and/or aids in changing the shape of the material. The concentric springs may or may not be wrapped around the underlying skeleton structure. Multiple springs or pairs of springs may be coupled together using a sheet metal connector, such as a piece of straight or curved steel.

Figure 1:
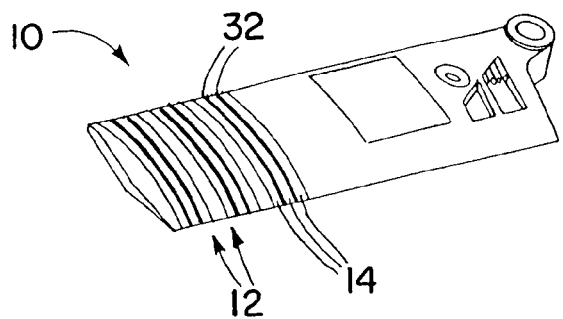
FIG. 1 is an oblique view of one structural member in accordance with an embodiment of the present invention, an extendable wing, with the wing illustrated in the retracted configuration.
Figure 2:
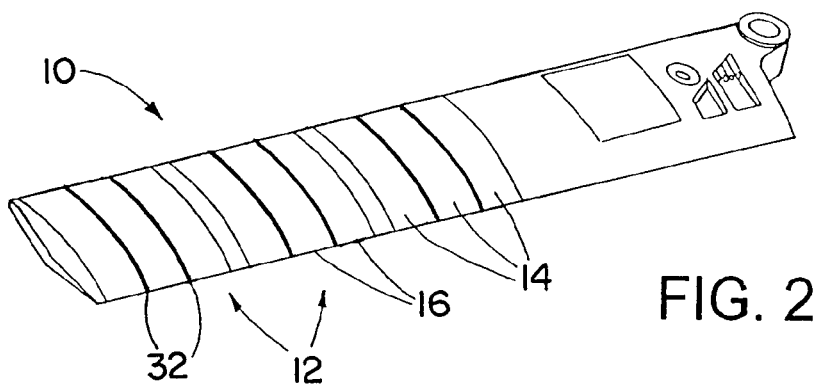
FIG. 2 shows the wing of FIG. 1 in an extended configuration.

FIGS. 1 and 2 show two configurations of a one example of a shape-chancing structure, a wing 10 that has a variable wingspan. The wing 10 has a number of shape-changing members 12, here being portions of the wing 10. The shape-changing wing members 12 can be expanded and contracted to change their shapes. FIG. 1 shows the wing 10 in a first (extended) configuration, with the segments 12 each increased in volume, and lengthened in the direction of the wingspan. FIG. 2 shows the wing 10 in a second (retracted) configuration, with the members 12 having a reduced extent in the direction of the wingspan.

The members 12 each have a shape-changing material 14. A shape-changing material is defined herein as a material capable of elastic deformation at strains of at least 5%. Certain types of shape-changing material, such as polymer foams, may be capable of elastic deformation at much larger strains, such as at strains of 300% or 400%. The shape-changing material 14 may be a foam material able to expand and contract in one or more directions, changing the volume of the material. The shape-changing material 14 may also be a solid material, which as used herein refers to a material that is substantially without voids.

The shape-changing material 14 may be a shape memory polymer material, either in solid form, as a foam, and/or as a gel. As explained in greater detail below, the polymer material may have mixed in it particles that are acted upon by the electromagnetic field.

Alternatively the shape-changing material may be a superelastic metal foam material 14. Superelasticity, sometimes referred to as pseudoelasticity, refers to a situation where a solid material undergoes a phase transformation that causes a reduction of the material's modulus of elasticity (Young's modulus). When mechanically loaded, a superelastic material may reversibly deform to very high strains, such as strains of 5 to 10%, or (more narrowly) strains in the range of 6 to 8%. The superelastic foam material may be a suitable metal alloy foam. One example of a suitable metal alloy for producing a superelastic metal foam material is a nickel titanium alloy, such as nitinol. The nitinol may be 55% nickel by weight, although other proportions may be used. Other possibilities include alloys of copper and zinc, with or without aluminum. In addition, the material for the superelastic foam alternatively be a suitable metallic glass. The superelastic metal foam of the members 12 may have a density as low as 10 to 20 percent of the theoretical density, when the foam is in an expanded state. It will be appreciated that other suitable foam densities may be employed.

The shape-changing members 12 have continuous outer surfaces 16 that remain continuous and unbroken throughout the shape change process. The shape changing process of the structure 10 thus is distinguished from structural movements in which one discrete part moves as a whole relative to another part. The maintenance of a continuous outer surface during a shape change process is advantageous in a wing, since a continuous outer surface may provide better aerodynamic properties for the wing. Shape change while maintaining a continuous outer surface may be referred to herein as "morphing."

Figure 3:
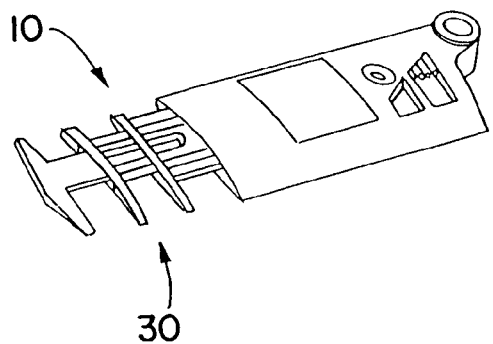
FIG. 3 shows the wing of FIG. 1 with the shape-changing material removed to show underlying extendable skeleton.
Figure 4:
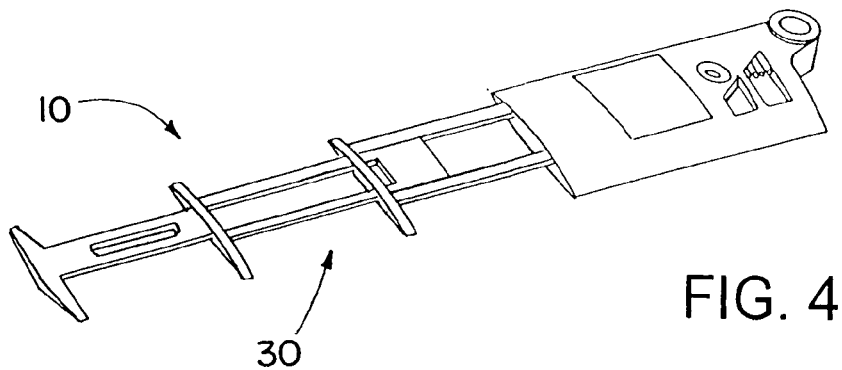
FIG. 4 shows the wing of FIG. 1 in an extended configuration, with the shape-changing material removed to show the underlying extendable skeleton segments.

FIGS. 3 and 4 show a skeleton 30 of the structure 10. The skeleton 30 includes one or more rigid members that underlie or otherwise support the shape-changing material 14. The skeleton 30 may be made of a suitable rigid material, such as a suitable metal. The skeleton 30 may itself be able to change shape, for example by being provided with an actuator to allow it to change its length, or by having parts slide relative to each other. Such actuation may be done with any of a variety of forces, such as by use of hydraulics, electrical motors, or piezoelectric materials. It will be appreciated that providing a continuous surface is desirable in a large number of situations, for example in reducing drag of aircraft and other moving vehicles. The skeleton 30 may provide support for the shape-changing material 14, and/or may be used to provide the force for putting a strain on the shape-changing material 14, to change the shape of the shape-changing material 14 when the material is in a "soft" state.

The various members in the structure 10 may be expanded/retracted individually, or substantially simultaneously. The shape-changing members 12 may be separated into segments that may be individually extended and retracted. The segments may be bordered by ribs 32 (FIGS. 1 and 2) which may provide structural support, as well as serving as electrically conductive plates for heating and/or providing electromagnetic forces. The change in wing length may be performed to optimize speed-related characteristics of an aircraft. Longer wings may be more suitable for long-duration low-speed flying, while shorter wings may be more suitable for faster speeds.

In addition to the skeleton 30, the shape-changing material 14 may be supported or reinforced by one or more coil springs embedded within the material 14. In addition, the springs may aid in providing the force to extend or retract the material 14. More generally, the springs may facilitate changing the shape of the shape-changing material. Several possible spring configurations are described below.

Figure 5:
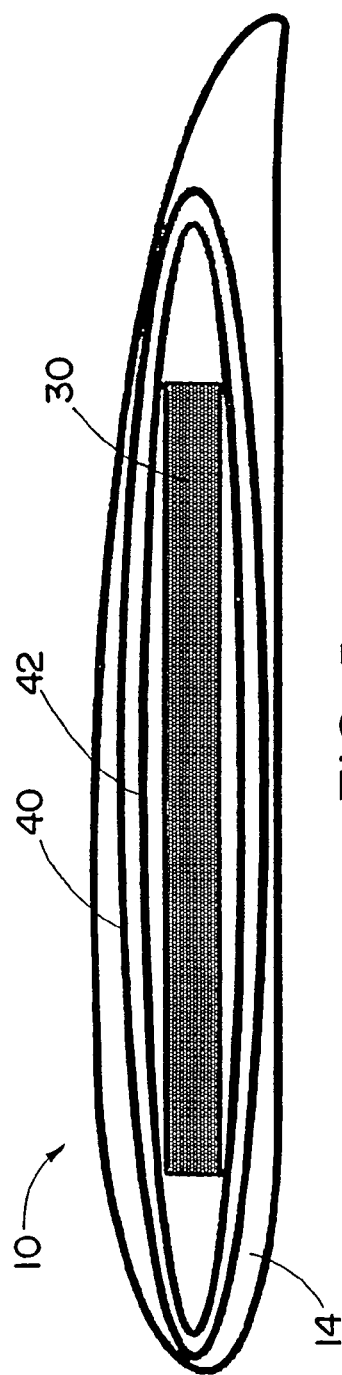
FIG. 5 is a cross-sectional view showing one spring configuration for use in the wing of FIG. 1.
Figure 6:
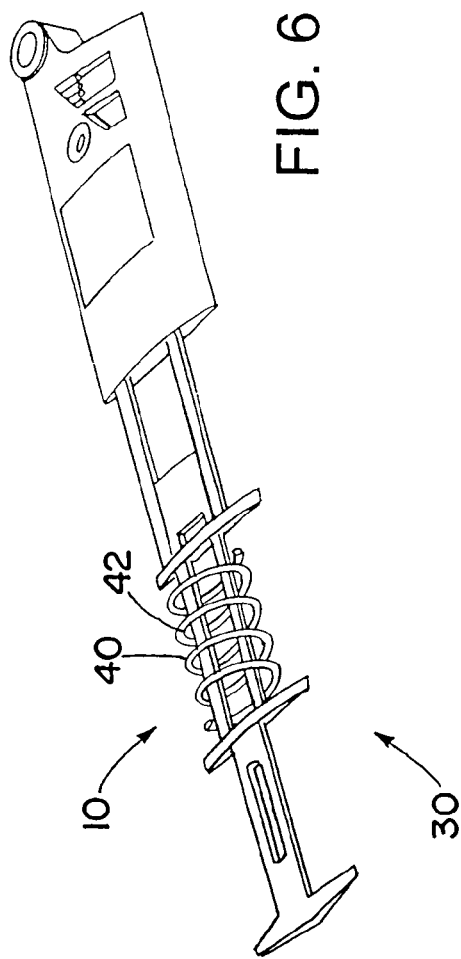
FIG. 6 is an oblique view showing part of the spring configuration of FIG. 5.

FIGS. 5 and 6 shows a pair of concentric coil springs 40 and 42 that surround and enclose the skeleton 30. The springs 40 and 42 have an axial (longitudinal) length in a direction along with the shape-changing material 14 is to be extended and retracted (along the direction of extension/retraction of the skeleton 30). The springs 40 and 42 provide structural support to the shape-changing material 14 that the springs 40 and 42 are embedded in. It will be appreciated that the springs 40 and 42 may be configured to elastically expand and contract (change their lengths) by a large amount. The springs 40 and 42 may be capable of an elastic length extension by a factor of 4 or 5. The springs 40 and 42 are anchored to structural material on opposite sides of the shape-changing material 14, such as the ribs 32 (FIG. 1).

One or both of the springs 40 and 42 may be made of a shape memory alloy, which may be solid or a metal foam. One type of shape memory feature involves the material changing crystalline structure, in essence changing phase, at certain temperatures when the material is heated and cooled. This allows the material to "learn" a certain shape that may be regained by subsequent heating, after cooling and shape change of the material. Other shape memory materials rely on other forces, such as magnetic forces, to trigger the shape memory feature. Shape memory features rely on transitions between various crystal structures that the material can be in. For example, the material may transition between austenite and martensite at certain temperatures while being heated and cooled. The material shape is set by heating the material well into the high-temperature austenite phase, and holding the material in place. Subsequently cooling of the material causes a transition into the low-temperature martensite phase. The material can be freely deformed in the martensite phase. Then when the material is subsequently heated so that it transitions to the austenite phase, the material spontaneously reverts to the shape set into it previously when it was at a high temperature in the austenite phase.

In addition, the metal alloy material of the springs 40 and/or 42 may transition from a high-modulus "strengthened" ("stiff" or "hard") state to a low-modulus "relaxed" or (relatively) "soft" state as the material passes through a transition temperature. For a metal alloy this transition temperature may correspond to a temperature at which a transition or phase transformation in the metal alloy occurs. The transition temperature at which the phase transformation takes place can be manipulated by how the metal material is alloyed or otherwise formed, and by how the metal material has been heat treated. The transition temperature thus may be set at a chosen temperature above a temperature of the environment around the foam material. Alternatively, the transition temperature may be set below a normal operating temperature of the material, or the environment around the material.

Where both of the springs 40 and 42 are made of shape memory alloys, the springs 40 and 42 may be set to have different transition temperatures, for example by having different compositions of the alloys of the two springs 40 and 42. The use of shape memory alloys having different transition temperatures allows the springs 40 and 42 to act as a bi-directional actuator for extending and retracting the shape-changing material 14 of the shape-changing member 12. Changing the temperature of the springs 40 and 42 individually changes the modulus of elasticity (Young's modulus) of the springs 40 and 42. In addition, heating may be used to cause the shape memory feature of the springs 40 and 42 to selectively separate or bring together plates, such as the ribs 32 (FIGS. 1 and 2), that are on opposite sides of the shape-changing material 14.

The springs 40 and 42 may act as a bi-directional actuator even if only one of the springs 40 and 42 is made of a shape memory metal alloy. The spring made of a conventional material, such as steel, will not significantly change its stiffness over a range of operating temperature. The spring made of a shape memory alloy will significantly change its stiffness as it passes through the transition temperature. The shape memory alloy material spring may be configured to have a modulus of elasticity above that of the conventional material spring when the shape memory alloy is in its stiff or hard state, below the transition temperature. The shape memory alloy material spring also may be configured to have a modulus of elasticity below that of the conventional material spring when the shape memory alloy is in its soft state, above the transition temperature. Thus the shape memory alloy spring may be dominant in shaping the material 14 below the transition temperature, and the conventional material spring may be dominant above the transition temperature.

The shape memory alloy for the springs 40 and/or 42 may be any of a variety of known shape memory materials. An example of a suitable material is nitinol. The metal alloy of the springs 40 and/or 42 may be the same as or different from the metal alloy (if any) in the shape-changing material 14.

It will be appreciated that as another alternative both of the springs 40 and 42 may be made of conventional material. In such a situation the springs 40 and 42 provide structural support only, and are not used to actuate extension or retraction of the material 14. For this alternative the springs 40 and 42 may be replaced by a single coil spring.

One or both of the springs 40 and 42 may be used for electrically heating the surrounding shape-changing material 14. The heating may be used to soften the material 14, for example bringing the material 14 above a glass transition temperature or a phase transition temperature. The electrical heating may also be used for bringing a shape memory alloy of the heated spring(s) above a transition temperature.

The springs 40 and 42 may extend across one or more discrete segments of the shape-changing material 14. As mentioned above, the springs 40 and 42 may be attached to structural members, such as the ribs 40 and 42, bordering or within the shape-changing material 14.

Figure 7:
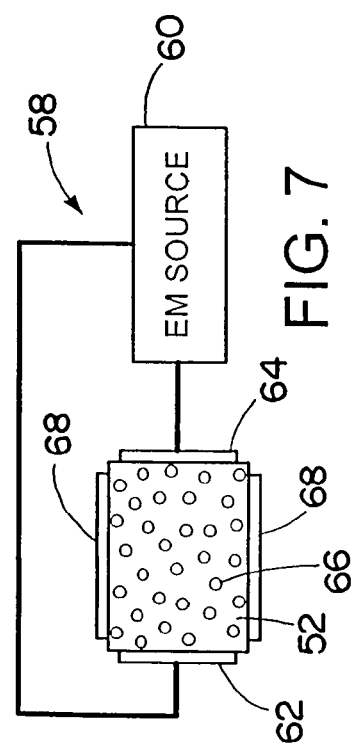
FIG. 7 is a diagram showing a possible the functional relationship of parts of a structural member in accordance with an embodiment of the invention.

With reference now to FIG. 7, the shape-changing material 14 may be a solid or foam shape memory polymer material 52. As is known, shape memory polymer materials and other materials may be heated above a glass transition temperature or plastic temperature, to enable them to change their shapes. However, when doing so it may be desirable to have the shape memory polymer material 52 still able to resist some forces on it. This ability to resist loads is greatly reduced when the shape memory polymer material 52 is sufficiently heated so as to soften it to allow it to change shape. For example, during shape change the Young's modulus of shape memory polymer foam is relatively low, and therefore the polymer material may not be able to carry significant loads. Some mechanism may be needed to increase the stiffness of the material when it is in this condition, in order to have the material resist loads. The springs 40 and 42 (FIG. 5) provide one such mechanism.

In addition, a shape-controlling electromagnetic field system 58 may be used to aid in maintaining the shape of the polymer material 52. The electromagnetic field system 58 includes an electromagnetic source 60 and a pair of electromagnetic elements 62 and 64. As shown in FIG. 7, the electromagnetic elements 62 and 64 may be on opposite sides of the shape memory polymer material 52. It will be appreciated that a wide variety of number, size, and configuration of electromagnetic elements are possible. For example, the electromagnetic elements 62 and 64 may be plates or wires. As another example the electrical elements may be metal foil elements embedded in the polymer material 52. It will be appreciated that the electromagnetic elements may be located in any of a variety of places within or near the material 52.

The electromagnetic field system 58 may provide an electric field and/or a magnetic field for controlling shape of the shape memory polymer material 52. Thus the electromagnetic elements 62 and 64 may be electrical elements, such as capacitor plates. Alternatively, the electromagnetic elements 62 and 64 may be magnetic field elements, such as coils.

The electromagnetic elements 62 and 64 may act on an inherent property of the shape memory polymer material 52. For instance, the electromagnetic field system may set up an electric field that acts on a dielectric constant of the shape memory polymer material 52.

The shape memory polymer material 52 may have particles 66 interspersed within it that are acted upon by the electromagnetic field system 58. The particles 66 may be magnetic particles that receive a force when acted upon by magnetic field set up by the electromagnetic field system 58. The magnetic particles may be magnetite particles. Particles that respond to an electrical field may be piezoelectric material particles. Additives to the shape memory polymer material 52 to increase its dielectric constant may include titanates or titanium compounds. Any sort of suitable particles with a high dielectric constant would be useful for this purpose. The particles 66 may be micron-size to nano-size particles.

The electromagnetic field system 58 may be used to heat the shape memory polymer material 52 in order to soften the material to change its shape. Alternatively or in addition one or more separate heating elements 68 may be used to heat the shape memory polymer material 52. As discussed above, the springs 40 and 42 (FIG. 5) may be used as separate resistive heating elements.

It will be appreciated that a wide variety of suitable additives may be used to make a polymer a shape memory polymer. The glass transition temperature and other characteristics of the shape memory polymer material may be controlled by the type and amount of additives. Other characteristics for the shape memory polymer material may be suitability for the chemical or other environment that the material is exposed to. The shape memory polymer material 52 may be either a polyurethane-based material or an epoxy-based material. Cyanate-ester-based materials may also be utilized. Foam materials have the advantage of having much greater strain capacities than neat resin materials. However, it will be appreciated that foam materials have less stiffness than solid materials. The Poisson's ratio of the neat resin may be around 0.4 to 0.5. This will result in significant lateral expansion and contraction of the foam material 12 with change of wingspan, unless some force is applied to hold the shape memory polymer material at the desired outer mold line. The Poisson's ratio of the shape memory polymer foam may be less than 0.1.

It will be appreciated that the electromagnetic field system 58 may be used to effect shape change in the material 52. Also, an electromagnetic field system as described above may be used in conjunction with other types of material, such as superelastic metal foam materials.

FIG. 8 shows an alternative spring arrangement in which a first concentric coiled spring pair 80 is located within a shape-changing material 14 at a leading edge 84 of a wing. A second concentric spring pair 90 is located within the material 14 at a trailing edge 94 of the wing 10. The spring pairs 80 and 90 are located outside of the skeleton 30, and are coiled such that their axes are directed perpendicular to the plane shown in FIG. 8. One or both of the springs in each spring pair 80 and 90 may include a shape memory alloy material. The spring pairs 80 and 90 are advantageously located where structural support is most needed on the wing 10. The spring pairs may thus be more efficient in providing uniform structural support. In addition, the smaller spring assemblies 80 and 90 may advantageously provide better, more uniform heating when the spring pairs 80 and 90 are used as resistive heaters.

FIG. 9 shows another spring configuration for the wing 10, with a number concentric coil springs or spring pairs 100, 102, 104, 106, and 108 at various locations within the shape-changing material 14, outside of the skeleton 30. The spring pairs 100-108 are all linked by a sheet metal connector 110. The sheet metal connector 110 may be one of multiple supports at various longitudinal (axial) locations along lengths of the spring pairs 100-108. The sheet metal connector 110, which may be made of sheet steel or another suitable metal, provides structural support wing 10, keeping the springs 100-108 in a fixed position relative to one another. The sheet metal connector 110 may serve as an alternative structure to be used in place of the ribs 32 (FIG. 1).

The springs or spring pairs 100-108 may include springs with shape memory alloy materials. Alternatively, the springs 100-108 may all be single-metal conventional springs.

The above descriptions have related to a single type of structure, an expandable wing 10. It will be appreciated that the concepts described herein are applicable to a variety of other structures where shape change and/or reconfiguration is desired.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A shape-changing structural member comprising:
a shape-changing structural material capable of elastic deformation at strains of at least 5% when the shape-changing structural material softens by being heated above a glass transition temperature or phase transition temperature; and
one or more springs embedded in the shape-changing structural material, wherein the one or more springs provide structural support to the shape-changing material to put or maintain the shape-changing material in a desired shape when the shape-changing material is above the glass transition temperature or phase transition temperature;
wherein the shape-changing structural member is part of an extendible wing.

2. The structural member of claim 1, wherein the structural material is substantially continuous throughout the structural member.

3. The structural member of claim 1, wherein the structural material is a solid polymer material.

4. The structural member of claim 1, wherein the structural material is a foam material.

5. The structural member of claim 4, wherein the foam material is a polymer foam.

6. The structural member of claim 5, wherein the polymer foam is a shape memory polymer foam.

7. The structural member of claim 4, wherein the foam material is a superelastic metal foam.

8. The structural member of claim 7, wherein the superelastic metal foam includes a metal alloy.

9. The structural member of claim 1, wherein the foam material is capable of elastic deformation at strains of at least 300%.

10. The structural member of claim 1, wherein the one or more springs includes a coil spring.

11. The structural member of claim 10, wherein an axial length of the one or more springs is in a direction in which the shape-changing material is to be extended and retracted.

12. The structural member of claim 1, wherein the one or more springs includes a pair of coil springs.

13. The structural member of claim 12, wherein at least one of the coil springs is made of a shape memory metal alloy.

14. The structural member of claim 12, wherein both of the coil springs are made of a shape memory metal alloy.

15. The structural member of claim 14, wherein the coil springs have different shape memory transition temperatures.

16. The structural member of claim 12, wherein the coil springs are concentric, with one of the springs inside the other of the springs.

17. The structural member of claim 16, further comprising additional pairs of concentric coil springs; wherein the pairs of coil springs support the shape-changing structural material at different locations within the material.

18. The structural member of claim 17, wherein the pairs of concentric coils springs are connected to each other by a metal connector.

19. An extendible aircraft wing comprising:
a shape-changing material configured to be extended and retracted when the shape-changing material softens by being heated above a glass transition temperature or phase transition temperature; and
a pair of concentric springs embedded in the shape-changing material;
wherein the springs have an axial length in a direction in which the shape-changing material is to be extended and retracted; and
wherein the springs provide structural support to the shape-changing material to put or maintain the shape-changing material in a desired shape when the shape-changing material is above the glass transition temperature or phase transition temperature.

* * * * *